Patented July 9, 1935

2,007,233

UNITED STATES PATENT OFFICE 2,007,233

PROCESS FOR MAKING ZINC SULPHATE AND IRON OXIDE

Carl Robert Clemens Curt Wespy, Oberlahnstein-on-the-Rhine, Germany, assignor to Carl Padberg, Barmen-Wuppertal, Germany No Drawing. Application September 9, 1931, Serial No. 561,996. In Germany September 12, 1930

5 Claims. (Cl. 23—125)

The present invention relates to the treatment of zinc oxide-containing materials, such as occur, for example in the roasting of blendes and also includes the working up of finely divided zinc, such as zinc dust. An important object of the invention is the production of pure zinc sulphate and iron oxide suitable for pigment purposes.

The process of this invention consists in finely grinding the zinc oxide-containing starting materials, then mixing the same with suitable quantities of compounds adapted to form zinc sulphate, if necessary drying and again comminuting the mixture and then heating the same to temperatures of about 650–750° C. The zinc sulphate formed is recovered by leaching. Sulphuric acid, as well as sulphates, may be employed for the conversion and if desired, mixtures of these substances may be employed.

In the conversion of the starting materials, for example with sulphuric acid, quantities of acid equivalent to the zinc present are with advantage employed. A strong evolution of heat takes place at the commencement of the reaction. When employing starting materials containing a high percentage of zinc oxide and fairly strong acid, the reaction mixture sets to a dry, solid mass, which is ground to powder without any difficulty. When employing more dilute acids, the reaction mixture does not necessarily set in this way. In the latter case the mass is with advantage subjected to a drying process.

The resulting product is then subjected to a heating process under access of air, by means of which any metallic sulphates, which may have formed from the metals or metal compounds contained besides the zinc in the starting material, such as in particular the sulphates of iron, manganese and the like, are decomposed and iron and manganese, etc., are simultaneously oxidized. The heating process is, therefore, carried out at temperatures above the decomposition temperature of the aforesaid sulphates, particularly iron sulphate. The temperature must, however, not be so great that any substantial decomposition of the zinc sulphate formed takes place. Suitable working temperatures accordingly lie between about 650° and 750° C. The process takes place most successfully at strong red heat, i. e. at temperatures of 700° to 720° C. The degree of heating to be maintained in each case, however, depends upon a number of circumstances such as, for example, the composition of the material under treatment, the possible presence of catalysts, the length of the time of the heat treatment and the like.

After the heating process, the material contains, besides zinc sulphate, the impurities, originally present in the starting material, in an insoluble or difficultly soluble form. Thus, for example, iron, manganese, copper, cobalt, nickel, and silver are present as oxides. Any chlorine present in the starting material will have vaporized. The zinc sulphate formed is brought into solution by leaching the mass, for example, with water, and is obtained in a very pure form by evaporation and crystallization. It has been found that, if necessary, the leaching may be effected with the aid of water to which sulphuric acid has been added. Any zinc sulphate decomposed being thereby reformed.

The residue may either be employed in the metallurgical processes corresponding to its composition or, in the presence of much iron and the absence of other impurities, be employed, for example, as an iron pigment.

The conversion of the zinc oxide-containing starting materials with sulphates has been found to be a particularly favourable method of carrying the invention into effect. Ferrous sulphate ($FeSO_4.7H_2O$) is with advantage employed as the sulphate. Depending upon the composition of the starting materials employed, larger or smaller quantities of ferrous sulphate, preferably equivalent to the zinc present, are added. By displacing the proportion of the zinc oxide-containing materials in favour of the ferrous sulphate employed, it is further possible favourably to influence the shade of colour of the iron oxide occurring as by-product.

According to this modification of the process, the mixture is first ground and dried as described above, a process which takes place readily and rapidly at low temperatures. The ferrous sulphate added gives off its water of crystallization without liquefaction. The material remains porous and agglomerates extremely readily. If necessary it is once again comminuted before the actual conversion.

The conversion of the mixture to zinc sulphate and iron oxide takes place during the subsequent heating process and proceeds almost quantitatively. At this stage of the process the temperatures hereinbefore specified are maintained. The conversion is completed in a comparatively short time and at comparatively low temperature, this being presumably due to the porous quality of the material. Possibly also the ease of conversion is to be attributed to catalytic influences. It is to be emphasized that during the reaction, any escape of sulphuric acid vapours is scarcely noticeable, the said vapours, owing to the fine grinding and mixing of the material, being probably immediately fixed by the zinc oxide.

The reaction mixture is leached with water, to which, if necessary, sulphuric acid may be added whereby decomposed zinc sulphate is reformed. The solution yields a pure zinc sulphate, which can be directly employed for industrial purposes. A residue of iron oxide free from iron sulphate, which has a very strong light red, orange-tinged colour, remains behind. These properties render the product particularly valuable as an iron pigment.

The above described process is remarkable insofar as the iron vitriol does not liquefy in its own water of crystallization. In the usual preparation of iron pigments from iron vitriol, the material sinters together, thus rendering a troublesome and costly drying process necessary. Such phenomena might also have been expected in the process according to this invention. Further, the conversion of dehydrated iron sulphate into iron oxide in the preparation of iron pigments requires, as is known, high temperatures and long periods of treatment. As a result thereof, the end product as a rule shows an undesirable brownish or blueish tint, which considerably limits its sphere of application. According to the invention it is possible to carry out the heating process at low temperatures in a short time and nevertheless to effect an almost complete conversion to zinc sulphate on the one hand and iron oxide on the other hand. Consequently the iron oxide occurring as by-product in the present process, in contradistinction to the iron oxide obtained in the usual decomposition of iron sulphate, is of a light yellow colour.

The invention renders it possible to prepare in a simple manner pure zinc sulphate, which may, for example, be directly employed for electrolysis. In order to produce a pure zinc vitriol by the processes of preparation hitherto usually employed, the numerous impurities contained in the starting material had to be removed in a troublesome and costly manner by precipitation, filtration, etc. These precautions are not necessary according to the process of the present invention. The simultaneous production of a valuable by-product increases the economy of the process to a considerable degree, and thus enables many zinc ores and zinc-containing waste products to be treated, which it was hitherto not economic to work up.

*Example*

A roasted blende of 65% Zn (equivalent to 81% of ZnO) is treated with ferrous sulphate $(FeSO_4.7H_2O)$ for example by adding to 100 kgms. of roasted blende about 278 kgms. of crystalline ferrous sulphate. The ferrous sulphate is first comminuted, well mixed with the roasted blende and the mixture heated in a rotating furnace in order to remove the major portion of the water of crystallization contained in the ferrous sulphate.

The mixture, which on drying easily frits together, is comminuted and heated at a temperature of 650° to 750° C. until the zinc is converted into sulphate and the ferrous sulphate into iron oxide. The reaction mixture is leached with water, the iron oxide filtered off, washed, dried and comminuted. The resulting product may then be employed as a pigment. The sulphate liquor is either allowed to crystallize or is evaporated to dryness and the dried sulphate calcined. It will be observed that the present invention provides a method of reacting an iron sulphate with a zinc-containing material to simultaneously produce an iron oxide and zinc sulphate whereby a transfer of sulphate takes place from an iron sulphate to zinc-containing materials without loss of the sulphate such as occurs in the usual manufacture of synthetic iron oxide colors under heat.

What I claim is:—

1. The process of simultaneously producing zinc sulphate and iron oxide which comprises mixing a zinc-containing material having zinc present to a major extent with ferrous sulphate, heating the said mixture to a temperature not lower than about 650° C. and up to about 750° C. to cause the formation of zinc sulphate and of iron oxide, and then leaching the zinc sulphate from the heated mixture whereby a solution of relatively pure zinc sulphate is obtained and a residue of red iron oxide capable of being used as a pigment is produced.

2. The process of simultaneously producing zinc sulphate and iron oxide which comprises mixing a zinc-containing material having zinc present to a major extent with ferrous sulphate, finely grinding the mixture, heating the said mixture to a temperature not lower than about 650° C. and up to about 750° C. to cause the simultaneous formation of zinc sulphate and iron oxide, and then leaching the zinc sulphate from the heated mixture whereby a solution of relatively pure zinc sulphate is obtained and a residue of red iron oxide capable of being used as a pigment is produced.

3. The process of simultaneously producing zinc sulphate and iron oxide which comprises mixing a zinc containing material having zinc present to a major extent with ferrous sulphate finely grinding the mixture, drying the finely ground mixture, heating the said mixture to a temperature not lower than about 650° C. to about 750° C. to cause the simultaneous formation of zinc sulphate and iron oxide, and then leaching the zinc sulphate from the heated mixture whereby a solution of relatively pure zinc sulphate is obtained and a residue of red iron oxide capable of being used as a pigment is produced.

4. The process set forth in claim 1 in which the amount of ferrous sulphate is approximately equivalent to the amount of zinc in the zinc-containing material.

5. The process of simultaneously producing zinc sulphate and iron oxide which comprises mixing a zinc-containing material having zinc present to a major extent with material containing sulphate of iron, heating the said mixture to a temperature not lower than about 650° C. and up to about 750° C. to cause the formation of zinc sulphate and of iron oxide, and then leaching the zinc sulphate from the mixture whereby sulphate is transferred from iron to zinc and a solution of relatively pure zinc sulphate is obtained and a residue of red iron oxide capable of being used as a pigment is produced.

CARL ROBERT CLEMENS CURT WESPY.